United States Patent [19]

Martell

[11] Patent Number: 4,884,467
[45] Date of Patent: Dec. 5, 1989

[54] CABLE CONTROL WITH SEAL

[75] Inventor: David R. Martell, Manchester, Mich.

[73] Assignee: Babcock Industries Inc., Fairfield, Conn.

[21] Appl. No.: 279,953

[22] Filed: Dec. 5, 1988

[51] Int. Cl.$^4$ .............................................. F16C 1/10
[52] U.S. Cl. ................................ 74/501.5 R; 74/502.4;
    277/152; 403/51; 403/330; 403/134
[58] Field of Search .............. 74/500.5, 501.5 R, 502,
    74/503, 18.1; 277/212 FB, 138, 12, 152, 153,
    165; 403/51, 50, 330, 134

[56] References Cited

U.S. PATENT DOCUMENTS

| 4,114,897 | 9/1978 | Bainard | 277/152 X |
| 4,258,927 | 3/1981 | Cather | 277/152 |
| 4,280,741 | 7/1981 | Stoll | 277/152 |
| 4,401,307 | 8/1983 | Dechavanne | 277/152 X |
| 4,512,672 | 4/1985 | Olschewski et al. | 277/152 |
| 4,553,761 | 11/1985 | Blesing et al. | 277/152 |
| 4,566,701 | 1/1986 | Bomgardner | 277/152 X |
| 4,669,737 | 6/1987 | Diffenderfer | 277/152 X |
| 4,694,705 | 9/1987 | Frankhouse et al. | 74/500.5 |
| 4,798,481 | 1/1989 | Frank | 277/152 X |

FOREIGN PATENT DOCUMENTS

| 1050214 | 2/1959 | Fed. Rep. of Germany | 277/152 |
| 1093974 | 5/1955 | France | 277/152 |
| 56-113861 | 8/1981 | Japan | 277/152 |
| 2052000 | 1/1981 | United Kingdom | 74/502.4 |

Primary Examiner—Vinh T. Luong
Attorney, Agent, or Firm—Barnes, Kisselle, Raisch, Choate, Whittemore & Hulbert

[57] ABSTRACT

A cable control system comprising a tubular member, a strand rod extending through the tubular member and adapted to be moved longitudinally and laterally thereof and a sealing member mounted on the tube member. The sealing member includes an outer circumferential wall extending axially outwardly relative to the tube member and an integral inner annular sealing lip surrounded by the axially outwardly extending wall and having a free edge sealingly engaging the strand rod.

12 Claims, 1 Drawing Sheet

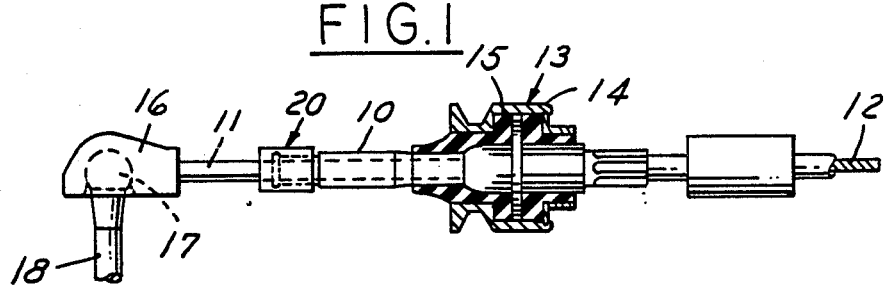
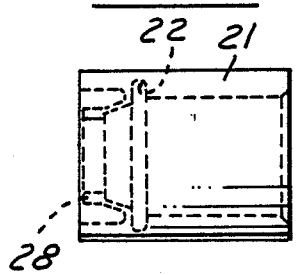
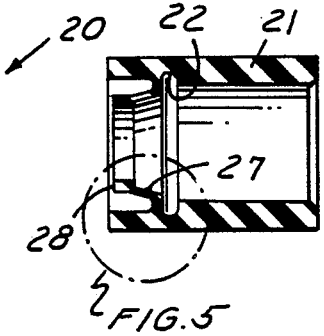
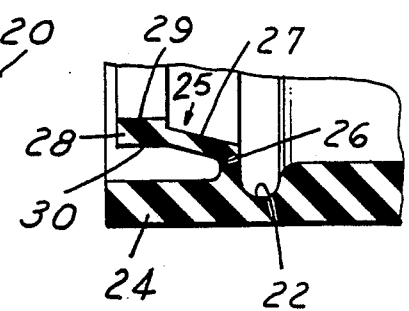
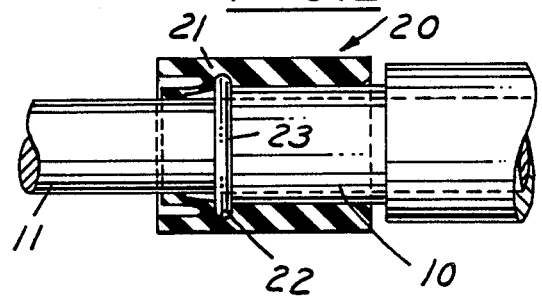
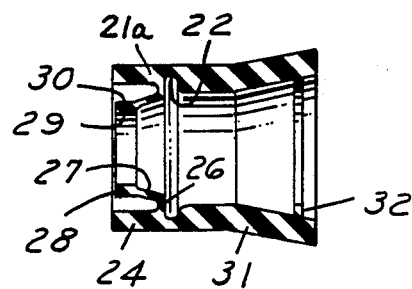

CABLE CONTROL WITH SEAL

This invention relates to cable control systems and particularly to a cable control system having a seal.

BACKGROUND AND SUMMARY OF THE INVENTION

It is common to utilize cable control systems which include an outer tube and an inner strand rod. A seal is often provided which is intended to seal the gap between the outer tubular member and the strand rod. In one type of seal that has been used, a plastic member is provided over the end of the tubular member and has a portion which extends radially inwardly to sealingly engage the rod end. One of the problems encountered with such type of a sealing member is that it exhibits accelerated wear due to relative transverse movement between the outer member and the strand rod where the strand rod is connected to another member by a pivoting connection. As the wear progresses, the sealing action is lost permitting contaminants to either enter and interfere with the relative travel of the outer and inner member or permit contaminants and moisture to enter, causing corrosion.

In automotive applications, strict testing procedures have been established for cable durability and environmental seal durability of controlled cables. Cable durability includes providing cables to design position in cycling the cable in both directions under controlled loads for a predetermined period of time. Environmental seal durability includes enclosing a sample in an environmental chamber and subjecting the sample to heat, cold or both, salt and mud spray and hot and cold static soak tests after which the cycling tests are continued.

Among the objectives of the present invention are to provide a system which has the required sealing but has less drag; which will accommodate transverse loads between the outer tubular member and the strand rod; which will have minimal wear which would reduce the sealing action; and which will have durability and environmental seal durability.

In accordance with the invention, the cable control system comprises a tubular member, a strand rod extending through the tubular member and adapted to be moved longitudinally and laterally thereof and a sealing member mounted on the tube member. The sealing member includes an outer circumferential wall extending axially outwardly relative to the tube member and an integral inner annular sealing lip is surrounded by the axially outwardly extending wall and having a free edge sealingly engaging the strand rod.

BRIEF DESCRIPTION OF THE DRAWINGS

FIG. 1 is a longitudinal view of a cable control system embodying the invention.

FIG. 2 is a fragmentary longitudinal sectional view of a portion of the system shown in FIG. 1.

FIG. 3 is a side elevational view of the sealing member utilized in the system.

FIG. 4 is a longitudinal sectional view of the sealing member.

FIG. 5 is a fragmentary sectional view on an enlarged scale taken about the circle 5 in FIG. 4.

FIG. 6 is a sectional view through a modified form of seal.

DESCRIPTION OF THE PREFERRED EMBODIMENTS

Referring to FIG 1, the cable control system embodying the invention comprises an outer tubular member 10 made of plastic or metal and a strand rod 11 telescopically received within the tubular member 10 and connected to a cable 12 extending through the tubular member. The tubular member 10 is resiliently mounted on a wall or the like by mounting assembly 13 including a bracket 14 and a resilient body 15. The end of the strand rod 11 is shown as having pivotal connection, shown as a ball socket member 16 which is engaged by a ball 17 on a transverse rod 18.

A sealing member 20 is provided on the tubular member 10 and comprises a generally cylindrical body 21 having an internal groove 22 which frictionally engages an annular rib 23 on the tubular member 10. The body 20 includes a first integral outer generally annular portion or wall 24 that surrounds an integral annular sealing portion 25. The sealing portion 25 includes a first radially inwardly extending portion 26, a second thin membrane 27 extending axially and radially inwardly and an enlarged free end or lip 28 which has a radial cross section substantially greater than the relatively thin membrane 27. As shown, lip 28 has inner and outer parallel straight coaxial surfaces 29, 30. The end 28 is adapted to engage the outer surface of the rod 11.

It has been found that by this construction, the sealing lip 28 is permitted to move transversely relative to the tubular member 10 accommodating relative lateral movement of the strand rod 11 and at the same time is restrained from following the axial movement of the strand rod 11.

In addition, if the strand rod 11 is connected to another member such as transverse rod 18 by pivoted connection such as a ball and socket connection, any lateral forces or longitudinal forces do not adversely affect the seal.

In the form of the invention shown in FIG. 6, the sealing member 20a includes a cylindrical body portion 21a and a inclined or frustoconical portion 31. This facilitates both manufacture and application of the seal. This form further includes radially inwardly annular bead 32 on the internal surface of the flared portion 21b to facilitate removal from a mold when the seal is molded.

In order to provide maximum durability of the seal, it is been found that the sealing member should preferably be made of thermal plastic urethane.

It can thus be seen that there is provided a system which has the required sealing but has less drag; which will accommodate transverse loads between the outer tubular member and the strand rod; which will have minimal wear which would reduce the sealing action; and which will have durability and environmental seal durability.

I claim:

1. A cable control system comprising a tubular member,
a strand rod extending through the tubular member and adapted to be moved longitudinally and laterally thereof, a sealing member mounted on the tubular member,
said sealing member including an outer circumferential wall spaced from and extending axially outwardly relative to the tubular member and an integral inner annular sealing lip surrounded by the axially outwardly extending wall, said integral annular sealing lip extending radially inwardly and axially outwardly relative to said wall and having a free edge sealingly engaging the strand rod.

2. The cable control system set forth in claim 1 wherein said sealing lip comprises a first radially inwardly extending portion, a second portion of thinner cross section extending axially and radially inwardly from the first radially inwardly extending portion and having a lesser cross section than the cross section of the first radially inwardly extending portion and a third generally axially extending enlarged portion having a greater radial cross section than the cross section of the second portion defining said annular sealing lip engaging the rod.

3. The cable control system set forth in claim 2 wherein said sealing lip has spaced generally coaxial inner and outer surfaces.

4. The cable control system set forth in claim 1 wherein said sealing member includes an annular groove, said tubular member including an annular rib frictionally engaging said groove.

5. The cable control system set forth in claim 1 wherein said system includes means resiliently supporting said tubular member.

6. The cable control system set forth in claim 1 wherein said sealiing member includes a outwardly flared body portion at the end opposite at which the sealing lip is provided.

7. The cable control system set forth in claim 6 including a radially inwardly extending rib on the inner surface of said radially outwardly extending portion.

8. The cable control system set forth in claim 1 wherein said sealing member is made of thermal plastic urethane.

9. For use in connection with a cable control system wherein a strand rod is movable longitudinally and laterally, a sealing member,
said sealing member including an outer circumferential wall adapted to extend axially outwardly relative to the tubular member and an integral inner annular sealing lip surrounded by the axially outwardly extending wall, said integral annular sealing lip extending radially inwardly and axially outwardly relative to said wall and having a free edge adapted to sealingly engage a strand rod wherein said sealing lip comprises a first radially inwardly extending portion, a second portion of thinner cross section extending axially and radially inwardly from the first radially inwardly extending portion and having a lesser cross section than the cross section of the first radially inwardly extending portion and a third generally axially extending enlarged portion having a greater radial cross section than the cross section of the second portion defining said sealing lip engaging the rod.

10. The sealing member set forth in claim 9 wherein said sealing lip has spaced generally coaxial inner and outer surfaces.

11. The sealing member set forth in claim 10 wherein said sealing member includes an annular groove, said tubular member including an annular rib frictionally engaging said groove.

12. A cable control system comprising a tubular member,
a strand rod extending through the tubular member and adapted to be moved longitudinally and laterally thereof, a sealing member mounted on the tubular member,
said sealing member including an outer circumferential wall spaced from and extending axially outwardly relative to the tubular member and an integral inner annular sealing lip surrounded by the axially outwardly extending wall, said integral annular sealing lip extending radially inwardly and axially outwardly relative to said wall and having a free edge sealingly engaging the strand rod,
said sealing lip comprising a first radially inwardly extending portion, a second portion of thinner cross section extending axially and radially inwardly from the first radially inwardly extending portion and having a lesser cross section than the cross section of the first radially inwardly extending portion and a third generally axially extending enlarged portion having a greater radial cross section than the cross section of the second portion defining said annular sealing lip engaging the rod,
said sealing lip having spaced generally coaxial inner and outer surfaces,
said sealing member including an annular groove, said tubular member including an annular rib frictionally engaging said groove,
said system including means resiliently supporting said tubular member,
said system including a transverse member, and means defining a pivoting connection between the strand rod and the transverse member.

* * * * *